(12) United States Patent
Hawkins

(10) Patent No.: US 7,559,243 B1
(45) Date of Patent: Jul. 14, 2009

(54) ANGEL SENSOR FOR ROTARY READ-OUT INSTRUMENT

(75) Inventor: ALfred J. Hawkins, Riverside, CA (US)

(73) Assignee: Irrometer Company, Inc., Riverside, CA (US)

( * ) Notice: Subject to any disclaimer, the term of this patent is extended or adjusted under 35 U.S.C. 154(b) by 0 days.

(21) Appl. No.: 12/148,722

(22) Filed: Apr. 21, 2008

(51) Int. Cl.
*G01L 9/04* (2006.01)

(52) U.S. Cl. .............................. 73/700; 73/732; 324/696

(58) Field of Classification Search .................. 73/700, 73/732, 741; 324/696
See application file for complete search history.

(56) References Cited

U.S. PATENT DOCUMENTS

| 4,583,925 A | * | 4/1986 | Hawkins | 417/555.1 |
| 5,179,347 A | * | 1/1993 | Hawkins | 324/696 |
| 5,749,521 A | * | 5/1998 | Lattery | 239/64 |
| 6,708,562 B2 | * | 3/2004 | Kruger et al. | 73/314 |
| 2003/0020466 A1 | * | 1/2003 | Lewis | 324/207.21 |

* cited by examiner

*Primary Examiner*—Andre J Allen
(74) *Attorney, Agent, or Firm*—Ladas & Parry LLP

(57) ABSTRACT

An attachment for an instrument having a rotary shaft whose position is indicative of a value being measured. A needle is attached to the shaft with an inherent magnetic field, or which carries a magnet. A sensor responsive to the direction of the field is supported above the needle, and reads out the angle of the needle relative to the sensor. These readings can be used for monitoring and control purposes.

7 Claims, 2 Drawing Sheets

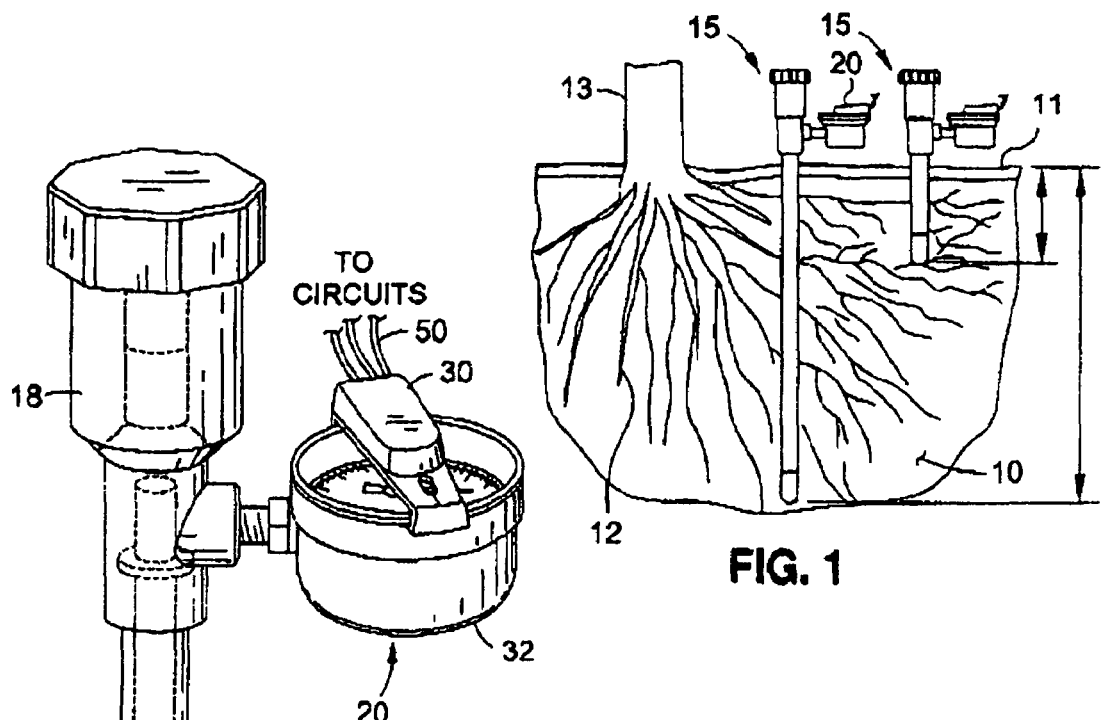
FIG. 1
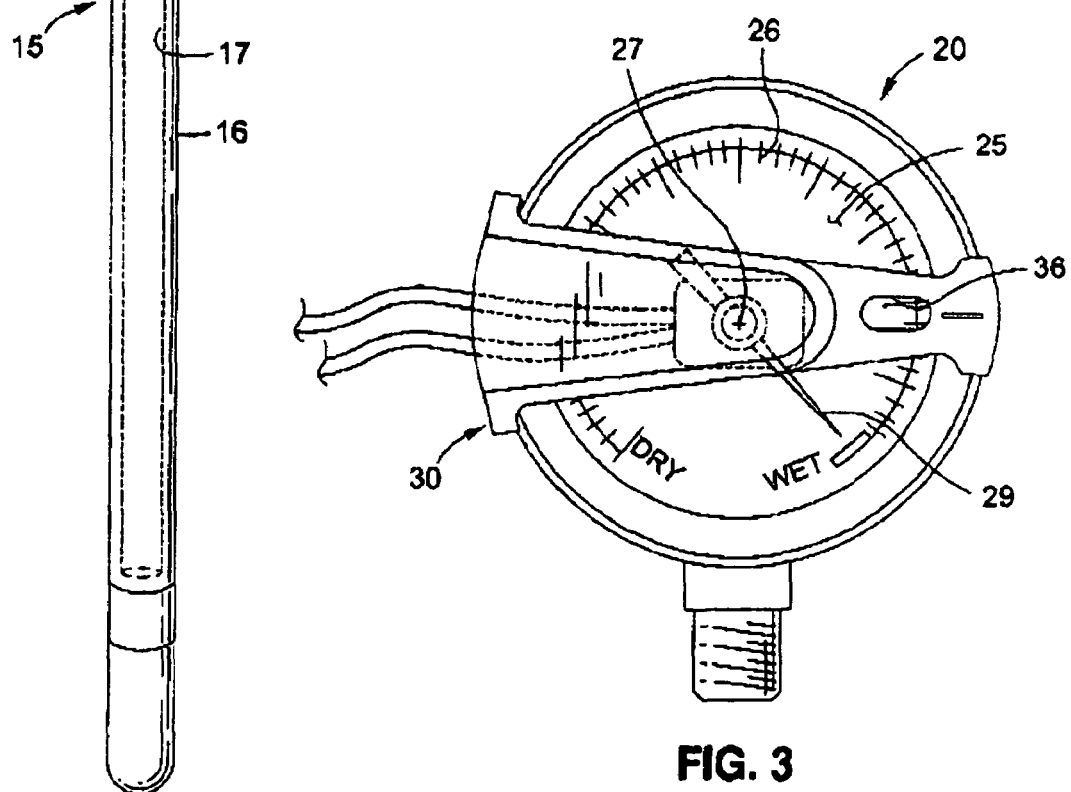
FIG. 2
FIG. 3

US 7,559,243 B1

ANGEL SENSOR FOR ROTARY READ-OUT INSTRUMENT

FIELD OF THE INVENTION

An angle sensor to respond to a rotary-reading instrument, in particular for responding to one which measures soil moisture, The sensor can provide a link in a supervisory or control system, for example to monitor and if needed also to control the supply of water from a water supply system to the cropland. It can be applied as an attachment to any instrument which utilizes a rotary shaft whose position is related to a value being measured, and can measure conditions other that moisture such as pressure, velocity, voltage, amperage and altitude, for example.

BACKGROUND OF THE INVENTION

Maintenance of the proper moisture content to roots of crops is critical for successful agriculture. Too much or too little water may waste precious water or create an unsatisfactory region for the roots to thrive in, either too dry or too wet.

Farmers who irrigate for their crops have for many years used their acquired knowledge to judge how much and when water is to be added. In recent years, agriculture technology has advanced considerably in determining what plants really need. Advanced irrigation systems such as drip irrigation enable rates of water supply and application of the water which are much more effective that long-established flooding techniques.

Of considerable importance has been the development of measuring devices which measure and read-out the moisture content already in the soil so that a more precise delivery of water can be made at a time and in an amount that is really needed-no more and no less. One long-established instrument of this type is the Irrometer tensiometer product sold by Irrometer Company, Inc. Of Riverside Calif., exemplified in U.S. Pat. Nos. 4,583,925 and 5,179,347.

In the Irrometer device the read-out is derived from measurement of pressure in the instrument itself which is developed as a function of the suction demand for water by the roots. This well-known measurement is customarily read out on the dial of a rotary-reading instrument, a pressure (vacuum) gauge.

In this device, a rotary indicator (a needle) points at an adjacent dial which carries indicia respective to pressure, for example of upper and lower suitable limits, or of numbers respective to the measures pressure, or of both.

Agriculturist have long used these measurements as informative guides to set irrigation controls as appropriate. It is an object of this invention to adapt this instrument for response to the needle position of its meter, and to provide a read-out that can be visual, or electronic. When electronic the signal can be electronically recorded or can be made part of an alarm or control system.

It is another object of this invention to be readily adaptable to meters used for other measurements, such as vehicle speed and altitude, for example by the simple addition of magnetic polarity to the needle or by a magnet attached to it, and a magnetic-field responsive rotary-position detector adjacent to the dial. This device is adaptable to a "snap-on". construction for existing instruments.

BRIEF DESCRIPTION OF THE INVENTION

In its preferred usage, which in agriculture, this invention is incorporated into a pressure-sensing device with a dial read-out that includes a pointer (needle) which is rotated by a pressure sensor. A Bourdon tube is a common pressure sensor. The rotary orientation of the pointer varies as a function of the pressure sensed by the instrument. This pressure may be above or below atmospheric. In agriculture applications it will usually be sub-atmospheric. In other usages, different values are "read" by the instrument.

This type of instrument is usually read by its user with reference to the indicia on a dial beneath the path of the needle-a conventional arrangement in rotary-needle devices.

It is an object of this invention to provide a rotary read-out angle sensor that senses and responds to the rotary position of the needle. The output of this angle sensor can be recorded and/or used as an input or signal to some other device to respond to a selected or programmed value. Then this sensor can provide for actuation or de-actuation of some related systems when the needle axis is aligned with a set point. That event provides a signal, perhaps to a display which is monitored, or as a source of control for automatic actuation or de-actuation of a system without direct input from an operator. Or an alarm simply to get the attention of an operator.

According to a preferred embodiment of this invention, the sensor is attached to the dial structure. The sensor is responsive to the field established by the directional magnetization of the needle, either directly by its own magnetization, or by a magnet attached to it. The sensor itself includes a non-contact field angle sensor that is responsive to the relative angulation of the needle relative to itself. It has its own control axis and is capable of recognizing and appropriately signaling the relative position of itself and the needle. The derived sensor condition can be utilized to control a system, perhaps an irrigation system, or some other system being monitored.

BRIEF DESCRIPTION OF THE DRAWINGS

The above and other features of this invention will be fully understood from the following detailed description and the accompanying drawings, in which:

FIG. 1 is a schematic illustration in-situ of plant roots and plant relative to the sensor of this invention;

FIG. 2 is a side view of a. tensiometer equipped with this invention;

FIG. 3 is a top view showing this invention attached to a gauge;

DETAILED DESCRIPTION OF THE INVENTION

Figure 4:
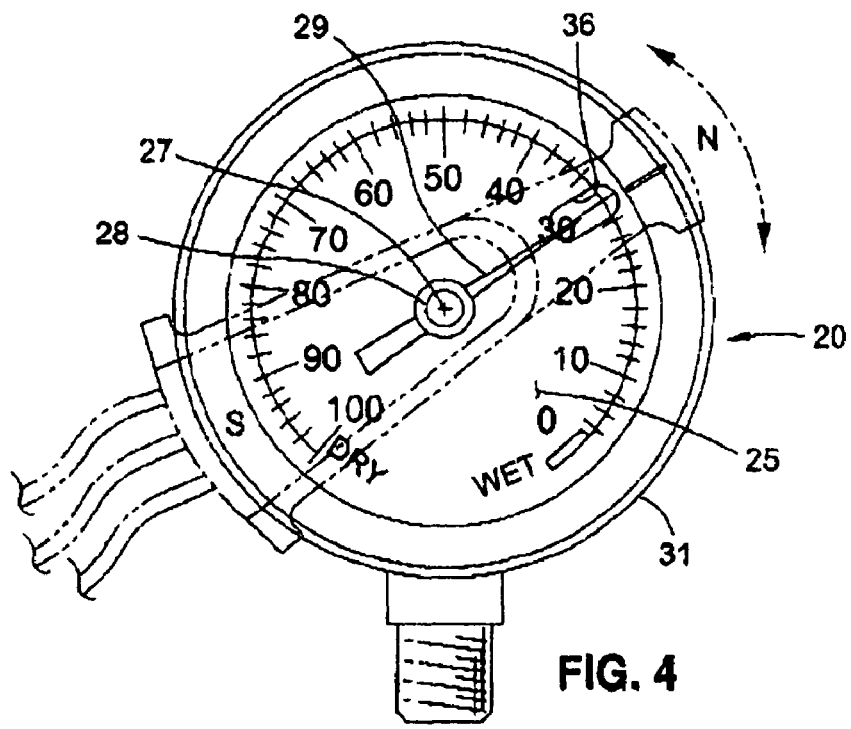
FIG. 4 is a top view similar to FIG. 3 showing the gauge in a different position.
Figure 5:
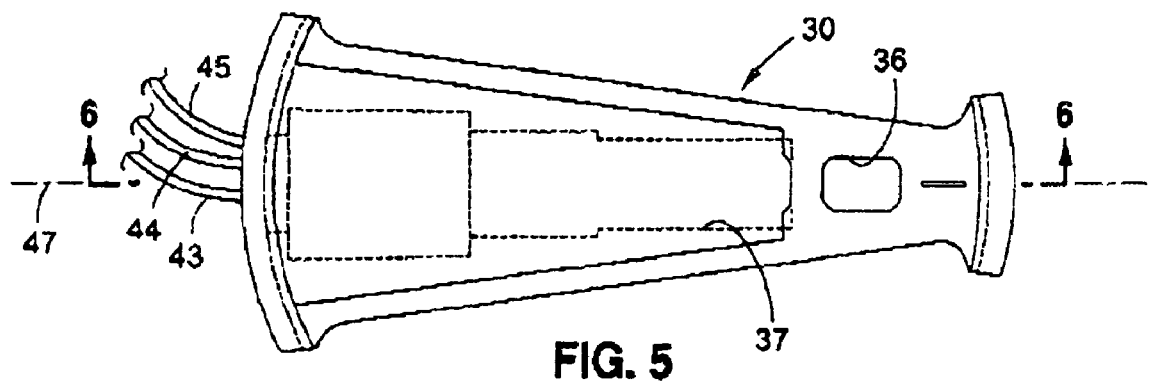
FIG. 5 is a top view of a fitting for use with this invention.
Figure 6:
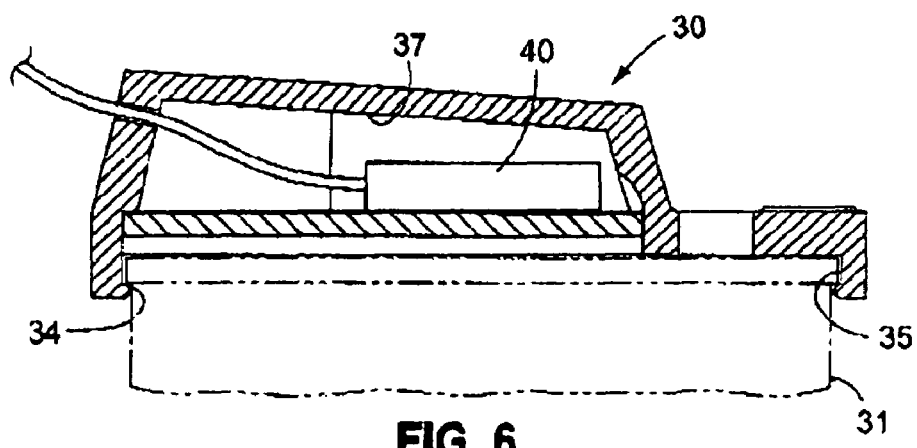
FIG. 6 is a cross-section taken at line 6-6 in FIG. 5.

The presently-preferred application of this invention is shown in the drawings and described below. It is applicable to any rotary-type read-out instrument. This example shows its utility in a root zone to enable the maintenance of proper moisture. A region 10 of soil beneath the surface 11 is occupied by roots 12 of a plant 13. The roots extract water from region 10. The agriculturist intends to have moisture present in this region for extraction by the roots. Excessive wetness is wasteful of water, and excessive dryness leads to stunted and wilted plants, among other problems. The objective is to provide just the correct amount of water, no more and no less.

The moisture may be supplied by any means including flooding the ground. More advanced techniques are surface drip, subsurface drip, and sprinklers. This invention provides a convenient means to monitor and control all such supply systems.

A typical tensiometer 15 (FIG. 2) includes a stem 16 with a porous tip and an evacuated region 17. Above it is a reservoir 18 to provide water to the device. A hermetically sealed gauge 20 is tapped into region 17, and is responsive to pressure in it. This pressure is indicative of the demand of the plants for water. This is a classical Irrometer tensiometer. U.S. Pat. Nos. 4,583,925 and 5,179,347 are included herein by reference for their teaching of the structure and operation of such devices.

The gauge has a visible dial 25 that carries indicia 26 relative to the pressure that the gauge senses (FIG. 4). The dial and the indicia extend arcuately around center 27. A shaft 28 centered on center 27 is rotated by pressure-responsive means responsive to pressure in region 17, such as a Bourdon tube (not shown). Shaft 28, in turn rotates a needle 29 which is mounted to it, as in a clock. The needle points to indicia respective to the pressure. In common practice, this is what the farmer sees and utilizes.

This invention greatly extends in the usefulness of this conventional device. A fitting 30 is attached to the circular rim 31 of the gauge housing 32 (structure). The gauge has a transparent cover (not shown). The fitting includes flanges 34, 35 fitted onto the rim curved so as to permit this fitting to be applied to any suitable arcuately-rimmed gauge. For convenience in reading, a window 36 is formed where it will overlap with the indicia so the user can readily see through it to see the pressure. For calibration or setting purposes, the fitting is placed at a position where it "points" to a pressure of interest. The fitting further includes a recess 37 in its bottom face for a purpose to be described.

The needle is either ferrous metal directionally magnetized, or has a magnet applied to it. The orientation of the needle around its center is also the orientation of its field. Perhaps the needle "points" will be the north, and other end of the needle the south. The null point of this magnet is disposed at the center.

An angle sensor 40 is mounted in recess 37 in fitting 30. Its function is to detect and signal the angular relationship between a magnet field from an object near to it, in this case the magnetic field of the needle. It is a flat product whose details are not of interest to this invention-only to its putput. An excellent angle sensor for use in this invention is the EM3241. Non-contact Angle Sensor produced and sold by ASAHI KASEI EMD through GMW at 955 Industrial Road, San Carlos Calif.

It is a flat plate carrying an array of conductors with a directional orientation, its major axis. Conductors 43, 44 and 45 are suitably connected such that any angular divergence of a field from major axis 47 is read as a divergence from coincidence parallelism. The signal is proportional to the parallelism of the needle magnet and the major axis 47 of the sensor of their variations. A maximum signal is generated when the field axis of the magnet is parallel to the major axis 47 of the sensor.

The fitting is applied to the rim, perhaps snapped on to its; and is spaced apart from the needle by an appropriate air gap.

In use, the output of the sensor is intended for information, notification, recording or control purposes. Assume that Appropriate circuitry leads 50 will extend to a source of visible or audible output such as a recording an alarm, or a switch to open or close a valve leading to an irrigation system. In some arrangements, more than one tensiometer may be provided at different depths (FIG. 1) or at different locations, or both. Then the desired wetness may be determined for more than one level or at more than one region and used in control logic.

If a more complicated system is desired a control system can be connected to a plurality of spaced-apart tensiometers, which can individually be polled to inform their pressure. This circuitry is within the competence of a person skilled in the circuitry art.

This invention enables a user to be remotely informed when moisture reaches a given amount, The opportunities for use of this product are widespread.

This information has been described relative to its best use at the present time. However, its scope is far larger. It is useful on any instrument which utilizes a rotatable shaft whose rotary position is determined by a physical condition being measured. Useful examples are instruments for sensing and displaying velocity, pressure, altitude, voltage and amperage no-limiting as examples. In every such arrangement the shaft is turned as part of a gauge that responds to the value being measured.

Generally speaking that shaft mounts a pointer or needle that the user can read it position relative to a display. These gauges need not be responsive to pressure, although many are. For example, a speedometer may measure the electrical field generated by a coil rotary in a magnetic field.

A principal advantage of this invention is its applicability to a wide variety of instruments. The common feature is its ability to be attached to a housing relative to a needle that is magnetic, or has a magnet applied to it so the use can readout the value as the needle rotates. If suitably configured, circuitry can be responsive to angular positions between these axes.

This invention is not to be limited by the embodiments shown in the drawings and described in the description, which are given by way of example and not of limitation, but only in accordance with the scope of the appended claims.

I claim:

1. In an instrument for displaying a measured condition, said instrument comprising:
   a supporting structure;
   a rotary shaft having an axis of rotation in said structures whose rotary position is determined by the value of the condition being measured;
   a dial directly adjacent to said rotary shaft, said dial including visible indicia respective to said condition;
   a needle mounted to said rotary shaft having a magnetic field normal to said axis;
   a fitting mounted to said structure overlaying and facing the needle and the dial, said fitting carrying a non-contact angle sensor with a central axis normal to said axis of rotation, responsive to the angular relationship between itself and the magnetic field of the needle.

2. Apparatus according to claim 1 in which the fitting is mounted to said structure in an adjusted position relative to a selected value.

3. Apparatus according to claim 1 in which the condition to be measured is pressure, velocity, voltage or amperage.

4. In an instrument for informing the occurrence of a measured value, said instrument comprising;
   first means for generating a pressure proportional to a condition of interest;
   second means converting said pressure to a mechanical motion; and
   a dial providing indicia respective to various pressure values and an arcuate structure supporting said dial;

the improvement comprising rotary means having a rotary position determined by the generated pressure with a portion of said rotary means overlaying said dial;

a fitting mounted to said structure, and overlaying parallel to, and spaced from said dial;

said rotary means having a magnetic field directed toward said indicia and a needle directed toward said indicia; and a non-contact angle sensor carried by said fitting with a central axis intersecting the center of rotation of the rotary means and responsive to the angle included between itself and the magnetic field of the rotary means.

5. Apparatus according to claim 4 in which said first means includes a hollow stem whose internal pressure is determined by withdrawal of moisture in which the stem is inserted; in which said second means is a Bourdon tube responsive to pressure in said stem, and in which said needle is magnetized.

6. Apparatus according to claim 5 in which said needle carries a magnet to provide said magnetic action.

7. Apparatus according to claim 5 in which said sensor produces an output reflective of the pressures, useful for recording control, control or alarm purposes.

* * * * *

UNITED STATES PATENT AND TRADEMARK OFFICE
CERTIFICATE OF CORRECTION

| | |
|---|---|
| PATENT NO. | : 7,559,243 B1 |
| APPLICATION NO. | : 12/148722 |
| DATED | : July 14, 2009 |
| INVENTOR(S) | : Alfred J. Hawkins |

It is certified that error appears in the above-identified patent and that said Letters Patent is hereby corrected as shown below:

On the Title Page, Section (54):

The correct title should be "ANGLE SENSOR FOR ROTARY READ-OUT INSTRUMENT"

Signed and Sealed this

Eighth Day of September, 2009

David J. Kappos
*Director of the United States Patent and Trademark Office*

UNITED STATES PATENT AND TRADEMARK OFFICE
CERTIFICATE OF CORRECTION

PATENT NO.        : 7,559,243 B1  
APPLICATION NO.   : 12/148722  
DATED             : July 14, 2009  
INVENTOR(S)       : Alfred J. Hawkins It is certified that error appears in the above-identified patent and that said Letters Patent is hereby corrected as shown below:

On the Title Page, Section (54) and Column 1, lines 1 and 2:

The correct title should be "ANGLE SENSOR FOR ROTARY READ-OUT INSTRUMENT"

This certificate supersedes the Certificate of Correction issued September 8, 2009.

Signed and Sealed this

Twenty-ninth Day of September, 2009

David J. Kappos  
*Director of the United States Patent and Trademark Office*